J. WALTON.

BAIL-EARS FOR PAILS.

No. 7,222. Reissued July 11, 1876.

Witnesses

Chas H. Smith

Harold Serrell

Inventor

Jonathan Walton per Lemuel W. Serrell

Atty

N. PETERS, PHOTO-LITHOGRAPHER, WASHINGTON, D. C.

UNITED STATES PATENT OFFICE.

JONATHAN WALTON, OF BROOKLYN, NEW YORK, ASSIGNOR TO THE DOUBLE POINTED TACK COMPANY OF NEW YORK.

IMPROVEMENT IN BAIL-EARS FOR PAILS.

Specification forming part of Letters Patent No. 77,853, dated May 12, 1868; antedated April 30, 1868; reissue No. 7,222, dated July 11, 1876; application filed June 14, 1876.

*To all whom it may concern:*

Be it known that I, JONATHAN WALTON, of the city of Brooklyn, in the county of Kings and State of New York, have invented a new and useful Improvement in Bail-Ears for Pails; and I do hereby declare that the following is a full, clear, and exact description thereof, reference being had to the accompanying drawings, forming a part of this specification.

This invention relates to a new and useful improvement in bail-ears for wooden pails; and it consists in constructing the ears of wire, bent in proper form, and attaching them to the pail by clinching, as will be hereafter described.

The present mode of attaching bails to pails is very defective. The wooden pails have simply thin metal plates attached, perforated with holes to receive the ends of the bail, which are bent to enter and hook into them.

Figure 1:
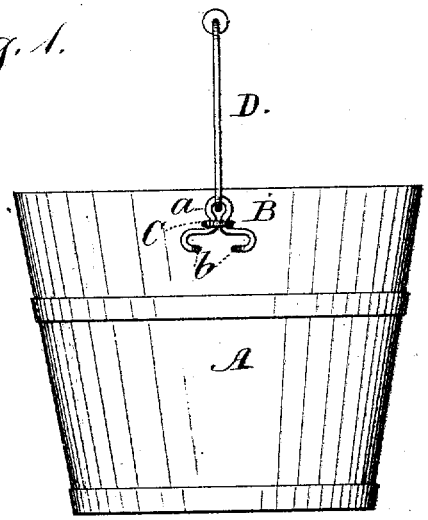
Figure 2:
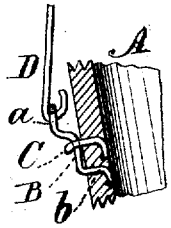

Figure 1 is a side view of a wooden pail having my improvement attached to it; Fig. 2, a vertical section of a portion of a wooden pail having my improvement applied to it.

The pail A is represented of wood, and to it my improved ears B are attached. These ears are of wire, bent into an eye or loop, *a*, and two prongs, *b b*, that are adapted to passing entirely through the wooden sides of the pail, and being clinched at the inner side. The staples C are of a size and shape adapted to encompass the ears just below the eyes *a*, to further secure them to the pail. These staples are to be clinched at the inner side of the pail. The ears B are bent or curved so that the eyes *a* will project outward from the side of the pail, and afford room to admit of the ends of the bail D being passed through them and bent in hook form.

I claim as my invention—

1. As a new article of manufacture, a bail-ear for pails, made of wire bent to form a loop, and having two prongs, that are clinched substantially as set forth.

2. The combination of the staple with the bail-ear *a b*, substantially as set forth.

3. A bail-ear made of wire, and having an eye for the bail between the two prongs, substantially as set forth.

Signed by me this 7th day of June, 1876.

JONATHAN WALTON.

Witnesses:

GEO. D. WALKER,

GEO. T. PINCKNEY.